Nov. 18, 1952 J. E. ALLEN 2,618,705

OSCILLATOR TUNING DEVICE

Filed Nov. 29, 1949

INVENTOR.
JOHN E. ALLEN
BY
Brown, Denk & Synnestvedt
AGENTS

Patented Nov. 18, 1952 2,618,705

UNITED STATES PATENT OFFICE 2,618,705

OSCILLATOR TUNING DEVICE

John E. Allen, Lansdale, Pa., assignor to Philco Corporation, Philadelphia, Pa., a corporation of Pennsylvania Application November 29, 1949, Serial No. 130,045

3 Claims. (Cl. 178—44)

The present invention relates to high-frequency oscillators, and, more particularly, to control means for effecting accurate and reliable frequency control of such oscillators.

It is a primary object of the present invention to provide control means for selectively conditioning a high-frequency oscillator either to generate waves of a frequency which is controllably variable over a predetermined range or to generate waves of a fixed predetermined frequency independently of the setting of the variable control means.

It is a feature of the invention that the improved switching and frequency-control means are fully and reliably operative at very-high and ultra-high oscillator frequencies.

In accordance with the present invention, there is provided a high-frequency oscillator comprising a coaxial-line tank circuit, a variable capacitor having control means for adjusting the capacitance thereof continuously over a predetermined range, and means coupling the variable capacitor to the coaxial-line tank circuit. Means, independent of the variable control means, are provided for changing the capacitance of the capacitor abruptly to a value considerably above the maximum value of said predetermined range. The structural arrangement is such that the resonant frequency of the tank circuit may be made either dependent upon the adjustment of the continuously adjustable control means or independent thereof.

An oscillator frequency-control arrangement constructed in accordance with the invention is peculiarly adapted for use in an electrical system in which a single oscillator is intended to fulfill selectively two functions. A typical example is a two-way radio communication system employing a transceiver in which a single oscillator is used to supply the transmitted carrier waves as well as to detect the received waves, for example, by superregenerative operation. In a two-way radio communication system, the frequency of the transmitted waves is fixed by governmental regulation and it is, therefore, desirable that the transmitting frequency be removed from the control of the transceiver operator. When receiving, however, the transceiver operator requires means for tuning over a selected band of frequencies (including, ordinarily at least, the transmitting frequency) since the other transceivers in the system will be transmitting on other frequencies within the band. It is necessary, therefore, that the transceiver oscillator be tunable over the preselected band when receiving.

While the oscillator frequency-control means of the present invention is particularly adapted to transceivers, its use is not confined thereto; the new means may be employed in various circuits and arrangements.

Figure 1:
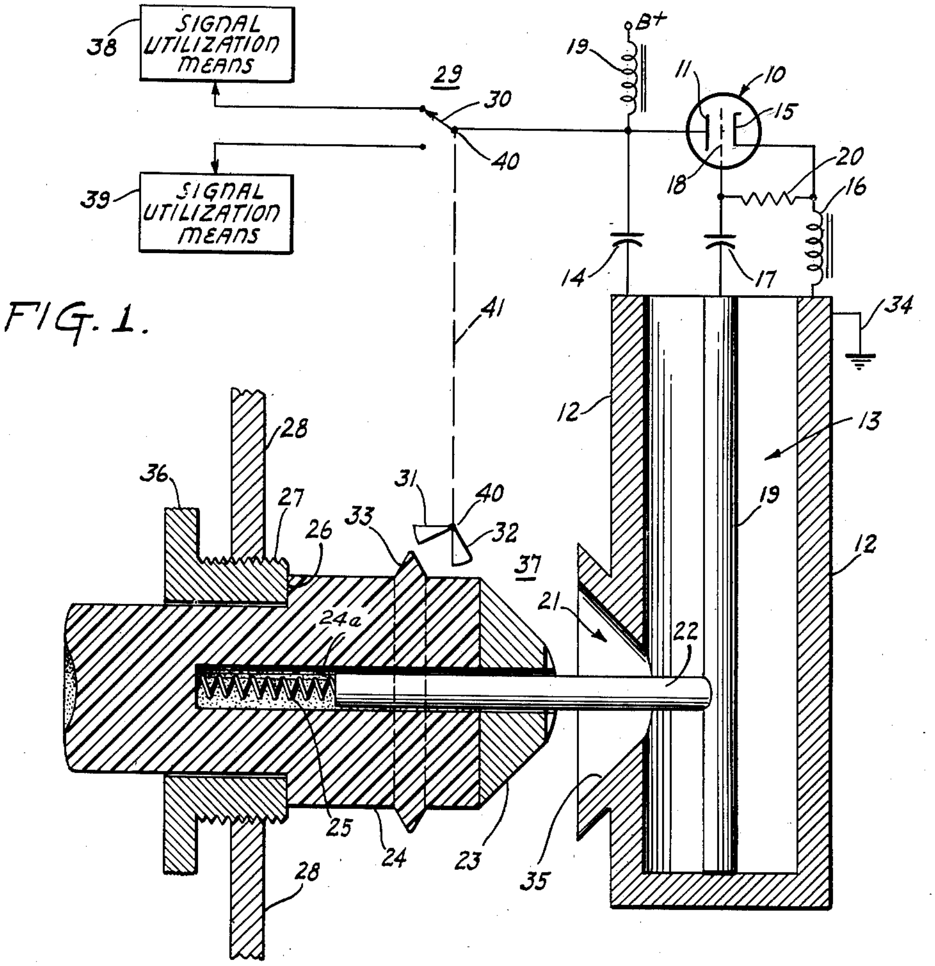
Figure 2:
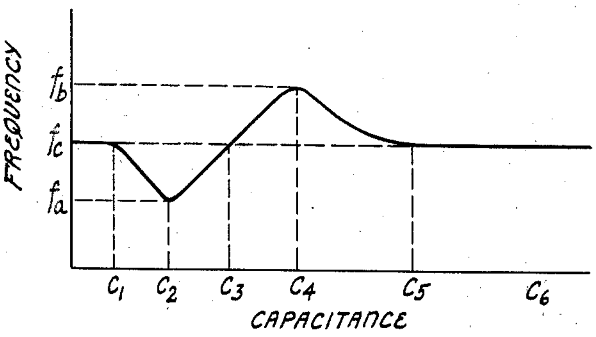

The manner in which my invention may be practiced and the objects realized will become clear from a consideration of the subsequent discussion and of the accompanying drawing wherein:

Figure 1 shows a high-frequency oscillator which includes a preferred embodiment of a frequency-control means constructed in accordance with the invention; and Figure 2 is an explanatory diagram to which reference will be made in describing the operation of the device shown in Figure 1.

With reference now to Figure 1, the oscillator illustrated therein comprises a triode 10 whose anode 11 is connected, by way of blocking capacitor 14, to the outer conductor 12 of a short coaxial transmission line 13. The outer conductor 12 may be maintained at ground potential, as by ground connection 34. The cathode 15 of triode 10 is also connected to outer conductor 12 but is isolated therefrom, for radio-frequency signals, by R.-F. choke 16. Coupling capacitor 17 connects control grid 18 of triode 10 to the center conductor 19 of the coaxial line 13 and grid leak 20 interconnects grid 18 and cathode 15. Suitable D.-C. anode potential B+, is applied to anode 11 by way of R.-F. choke 19. The signal output of the oscillator is, of course, derived from the anode circuit of triode 10.

The coaxial transmission line 13 is open at the near end (to which the triode electrodes are connected) and is shorted at the far end, thus providing the required oscillator tank circuit whose parameters determine the operating frequency of the oscillator. A flared aperture 21 is provided in outer wall 12, and a conductor 22, connected physically and electrically to center conductor 19, is brought out therethrough. In the preferred arrangement, the wall 12 of coaxial line 13 is cylindrically symmetrical about center conductor 19, which is also of cylindrical configuration, and the flare 35 of aperture 21 may be rotationally symmetrical about conductor 22, which is preferably of firm and rigid cylindrical construction.

Concentric about conductor 22, and in slidable engagement therewith, is a tapered plug 23 of conductive material. Plug 23 is shaped substantially to conform to the shape of the flared aperture 21 and has a hole therein to receive cylindrical conductor 22. Plug 23 is firmly secured to a non-conductive cylindrical button 24, the right-hand or plug end of which is provided with a cylindrical well 24a into which conductor 22 fits. A compressed spiral spring 25 is placed in the bottom of well 24a. Spring 25 tends to keep button 24 in non-depressed position, thereby keeping plug 23 withdrawn from aperture 21. The left-hand portion of button 24 is of smaller diameter than the right-hand portion, thus providing a shoulder 26 which tends to abut against an adjustable annular stop 27 which is in threaded engagement with supporting wall 28. It will be seen that the withdrawal of plug 23 from aperture 21 under the action of spring 25 is limited by the position of stop 27 and that adjustment of stop 27 is readily made by rotating its knurled annular end 36. The left-hand end of button 24 preferably extends through and beyond the knurled end 36 of concentric stop 27.

In the preferred embodiment, wall 28 comprises a portion of the housing of the equipment. The annular knurled end 36 of stop 27 and the left-hand end of button 24 protrude from the housing so that adjustment in the position of plug 23 may be readily made.

The device shown in Figure 1 operates as follows:

Plug 23 and the flared rim 35 of aperture 21 cooperate to form a capacitor 37 which is effectively coupled into the oscillator tank circuit. The capacitance of capacitor 37 varies with the degree of insertion of plug 23 into the flared aperture 21, and is at a maximum when the plug is fully inserted. This capacitance has, within limits, a controlling influence upon the operating frequency of the oscillator.

In Figure 2, I have plotted the operating frequency of the oscillator against values of capacitance of the capacitor 37. The graph shows that the frequency of the oscillator varies with this capacitance within the limits $C_1$ and $C_5$, but that for values of capacitance above $C_5$ the frequency of the oscillator remains substantially fixed at $f_c$. The capacitance of capacitor 37 is controlled, of course, by the degree of insertion of plug 23 into flared aperture 21. The graph also shows that between the capacitance values $C_2$ and $C_4$ the frequency increases as the capacitance increases, and that at a value $C_3$ between $C_2$ and $C_4$, the oscillator frequency is $f_c$, which is the same as when the capacitance of capacitor 37 is higher than $C_5$, as for example, $C_6$. At value $C_6$, the plug 23 occupies a position deep in the flared aperture 21, and in this position, adjustments thereto have no appreciable effect upon the oscillator frequency, which remains substantially fixed at $f_c$.

Referring again to Figure 1, the dimensions of the structure there shown are so chosen that the capacitor 37, formed by the flared rim 35 and the plug 23, determines the frequency of the oscillator whenever plug 23 is in its normally retracted position with shoulder 26 of button 24 abutting against annular stop 27. The capacitance of capacitor 37 is readily adjusted by means of stop 27, since the degree of threaded engagement of stop 27 with wall 28 determines, within predetermined limits, the degree of insertion of plug 23 into flared aperture 21. Thus, by adjustment of stop 27, the oscillator may be tuned over the range of frequencies extending from $f_a$ to $f_b$ in Figure 2.

It will be understood that when the oscillator structure shown in Figure 1 is employed in a transceiver, the incoming signals may be tuned in by rotating the knurled control knob 36 to vary the position of stop 27.

To switch the oscillator into its fixed-frequency (or transmitting) condition, the button 24 is depressed, as by the finger of the operator, thus forcing plug 23 forward into close proximity or actual engagement with the flared rim 35. If there be actual engagement between plug 23 and rim 35, the capacitor 37 is, of course, shorted, and the oscillator will operate at the frequency $f_c$ determined by the parameters of the coaxial tank circuit. If there be no actual engagement between plug 23 and rim 35, the close approach of the plug to the rim will nevertheless increase the capacitance of capacitor 37 to a value higher than $C_5$, as for example $C_6$ (Figure 2), and the oscillator will operate at the frequency $f_c$. This is the same frequency as that at which the oscillator operates when capacitor 37 is shorted.

In Figure 1, a two-position switch 29 is provided having its movable arm 30 fixed to shaft 40 and connected electrically to the anode 11 of the oscillator triode 10. By means of switch 29, the oscillator output may be delivered to either one of two different signal-utilization means 38, 39.

In the preferred embodiment, an arrangement is provided whereby movement of the button 24 automatically operates switch 29 and causes the oscillator output to be delivered to the desired signal-utilization means. As shown in Figure 1, the arrangement comprises a pair of pallets 31, 32 fixed to shaft 40 and an annular ring 33 so positioned on button 24 that, when the button is depressed, pallet 32 is engaged by ring 33 and both pallets are moved counter-clockwise about shaft 40. When button 24 is retracted, pallet 31 is engaged and both pallets are moved clockwise about shaft 40. Pallets 31, 32 and movable arm 30 of switch 29 are mounted on common shaft 40, as indicated by dashed-line 41, so that movement of the pallets, in response to movement of button 24, produces rotation of the movable arm 30, thereby switching the oscillator output to the desired signal-utliization means.

In Figure 1, the upper signal-utilization means 38 may, for example, be the receiving circuits of a communication transceiver, while the lower utilization-means 39 may be the transmitting circuits of the transceiver. In such case, depressing button 24 effects connection of the oscillator output to the transmitter circuits of the transceiver, and releasing button 24 effects connection to the receiver circuits.

While the present invention may find application in a variety of oscillators operating over widely different frequency ranges, the invention may be employed to particular advantage in oscillators operating at very-high and ultra-high frequencies. At lower frequencies, switching the oscillator from one frequency to another, as for example, from the receiving to the transmitting frequency, can be accomplished satisfactorily by conventional means. But at very-high and ultra-high frequencies, conventional switches have inherent inductance and capacitance which do not reach consistent values until some time after the switch has been thrown. The present invention permits the high-frequency oscillator to be quickly and accurately switched from one high frequency to another, as for example, from the receiving to the transmitting frequency, without doing any actual switching in the R.-F. circuits, the tuning control being automatically decoupled from the tank circuit when the button 24 is depressed.

Having described my invention, I claim:

1. A high frequency oscillator tank circuit comprising: a coaxial transmission line having a closed and an open end, and provided with an aperture, said aperture having an outwardly flared rim, a rigid branch conductor, originating at the center conductor of said coaxial line and protruding from said aperture in coaxial relation therewith, a conductive plug shaped to conform to said aperture and its flared rim and in coaxial engagement with said branch conductor, a non-conductive plunger attached to said plug, extending therefrom in the direction away from said opening and provided with a well, the end of said branch conductor projecting into said well, a pressure spring confined in said well intermediate said end of said branch conductor and the bottom of said well and adapted to exert a limited force on the bottom of said well tending to separate said plunger and its attached plug from said flared rim, a rigid supporting member and an annular stop member in adjustable threaded engagement with said supporting member, said plunger extending concentrically through said stop member and said plunger being further provided with a retaining shoulder normally abutting against said stop member under the influence of the force exerted on said plunger by said spring.

2. In a variable high-frequency oscillator, a tank circuit comprising: a coaxial transmission line having inner and outer conductors, said coaxial line being shorted at one end and effective to determine the normal operating frequency of said oscillator; an aperture provided in said outer conductor, an outwardly-flared rim surrounding said aperture; a conductive plug shaped to conform to the shape of said aperture and rim, said plug coacting with said rim to form a capacitor; a branch conductor, originating at said inner conductor of said coaxial line, similar to said inner conductor and extending outwardly therefrom through said aperture and through an opening provided therefor in said conductive plug, said flared aperture and said plug being in concentric relation with said branch conductor; adjusting means for varying, within predetermined proximal and distal limits, the proximity of said plug with respect to said flared aperture, thus to vary, within predetermined limits, the value of capacitance of said capacitor; and means, operative independently of said adjusting means, for moving said plug into engagement with said flared aperture.

3. In a variable high-frequency oscillator, a tank circuit comprising: a coaxial transmission line having inner and outer conductors, said coaxial line being shorted at one end and being effective to determine the operating frequency of said oscillator; an aperture provided in said outer conductor, said aperture being surrounded by a conductive rim; a conductive plug coacting with said rim of said aperture to form a capacitor; a branch conductor, originating at said inner conductor and extending outwardly therefrom concentrically through said aperture and through an opening provided therefor in said conductive plug; adjusting means for varying, within predetermined proximal and distal limits, the proximity of said plug with respect to said aperture, thus to vary, within predetermined limits, the value of capacitance of said capacitor; and means, operative independently of said adjusting means, for moving said plug into engagement with said aperture rim.

JOHN E. ALLEN.

REFERENCES CITED

The following references are of record in the file of this patent:

UNITED STATES PATENTS

| Number | Name | Date |
|---|---|---|
| 2,404,568 | Dow | July 23, 1946 |
| 2,411,424 | Gurewitsch | Nov. 19, 1946 |
| 2,510,064 | Bryan | June 6, 1950 |
| 2,153,796 | Goddard | July 4, 1950 |
| 2,515,225 | Holst | July 18, 1950 |